April 8, 1969  R. J. STRACEK  3,437,105
REEL ASSEMBLY

Filed Jan. 10, 1966  Sheet 1 of 2

INVENTOR
Robert J. Stracek
BY
ATTORNEY

April 8, 1969  R. J. STRACEK  3,437,105
REEL ASSEMBLY
Filed Jan. 10, 1966
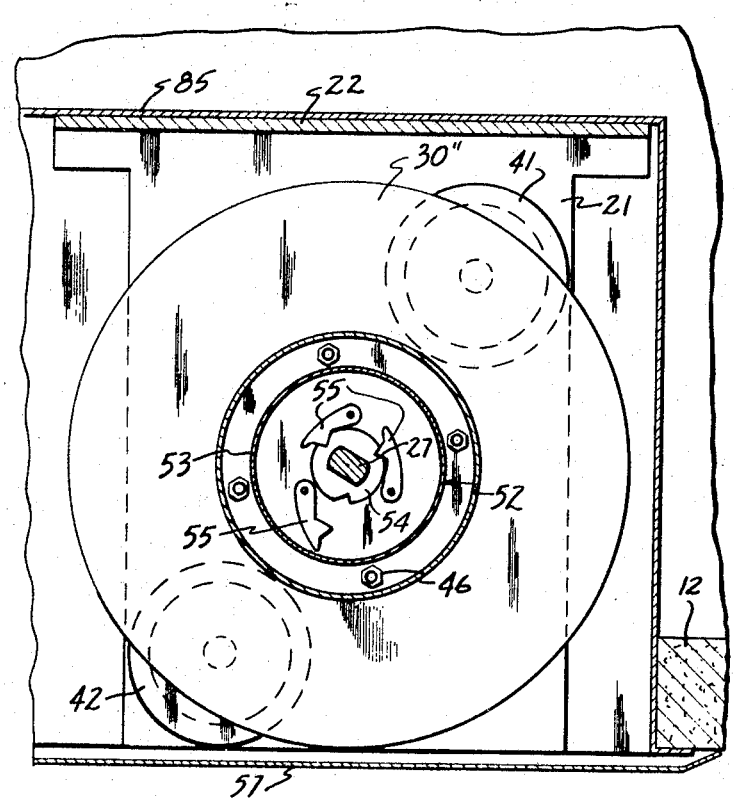
FIG. 5
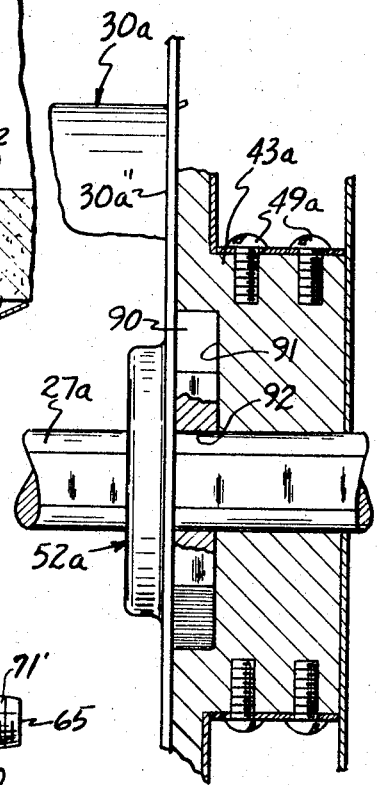
FIG. 7
FIG. 6
INVENTOR
Robert J. Stracek
BY
ATTORNEY United States Patent Office 3,437,105
Patented Apr. 8, 1969

1

3,437,105
REEL ASSEMBLY
Robert J. Stracek, Mount Prospect, Ill., assignor to Chemetron Corporation, Chicago, Ill., a corporation of Delaware
Filed Jan. 10, 1966, Ser. No. 519,542
Int. Cl. F16l 3/18
U.S. Cl. 137—355.23   3 Claims

ABSTRACT OF THE DISCLOSURE

Reel assembly for flexible hose having a reel rotatably mounted on a fixed shaft and a body section attached to the side of the reel in alignment with the shaft. A fixed stem is rotatably received by the body and is in communication with a gas supply and the hose wound on the reel assembly.

---

This invention relates to a reel assembly for a flexible member and in particular to a reel assembly for a hose adapted to conduct a fluid medium.

It is a feature of the invention to provide a reel assembly which can be easily and quickly mounted and dismounted from a box preferably disposed at the ceiling or in a wall of a room wherein the end of the hose can be brought down to a convenient level and can be moved upwardly out of the way when not in use. The hose is received about a reel which is driven by a constant torque spring motor means so that regardless of the length of hose unwound or paid out from the reel the amount of energy stored to drive the reel in the rewinding direction to cause the hose to be rewound onto the reel remains substantially constant. The reel assembly of the invention in addition to being compact has, in combination, a swivel assembly which provides constant communication between hose and a source of fluid under pressure or vacuum and the frictional resistance provided by the swivel assembly remains constant even though the fluid pressure or vacuum pressure at the swivel assembly varies. The reel assembly of the invention can be easily assembled and disassembled.

In the drawings:

FIGURE 5 is a sectional view taken along line 5—5 of FIGURE 2;

FIGURE 6 is a view, mainly in section, of a swivel assembly shown in elevation in FIGURE 2; and FIGURE 7 is a fragmentary view showing an alternative embodiment of the reel assembly of the embodiment of FIGURES 1 through 6 of the drawings.

Figure 1:
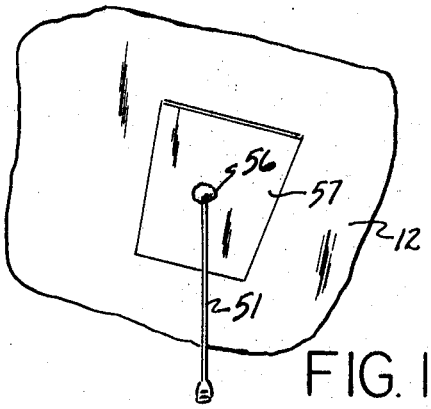
FIGURE 1 is a perspective view showing a cover plate and a portion of a hose of a reel assembly.

Referring now to FIGURES 1 through 6 of the drawings there is shown a reel assembly generally indicated at 10 mounted in an enclosure or box 11 disposed, for example, in the ceiling 12 of a room. The box 11 is shown to be suitably secured in the ceiling 12. A conduit 13, projecting into the inside of the box 11, is connected to

2 a flexible hose 14 which in turn is connected to a fitting 15. The fitting 15 is threadably secured to a stem 16 disposed in a body section 17 of a swivel assembly generally indicated at 18.

The reel assembly 10 has a U-shaped frame generally indicated at 19 having plate portions 20 and 21 joined by a mounting portion 22. The plate portion 20 has the flange 23 secured by threaded fasteners 24 to the mounting plate 22. The plate portion 21 and the mounting portion 22 are joined at a bend 25.

The plate portions 20 and 22 serve as a mount for pivot means generally indicated at 26. The pivot means includes the swivel assembly 18 and a shaft 27 secured in coaxial alignment to one side of the swivel assembly. The shaft 27 has a flat 28 which matches a flat in a disc 29 secured to the side plate 21 to prevent rotation of the pivot means with respect to the frame 19. A reel 30 has side plates 30′ and 30″ and a hub hollow portion 31 with opposite central bores 32 at each side. A plate 33 is secured to the hub portion 31 by threaded fasteners 34. The plate 33 is secured to the body section 17 of the swivel assembly 18 by three equally spaced apart threaded fasteners 35, only two of which are shown. The plate portion 20 has an annular opening 36 which receives a split annular strip of material which is U-shaped in section. Annular portion 38 of the body section 17 is received in the strip of material 37.

Spring motor mechanisms generally indicated at 39 and 40 are shown to include respective spools 41 and 42 and a common spool 43. This type of spring motor mechanism is disclosed in booklet 12C/Hu entitled "The Hunter negator and other spring devices," Hunter Spring, a division of Ametek, Inc., Hatfield, Pa., copyright 1963, especially pages 16 through 23. Reference is also made to U.S. Patent No. 2,647,743 which details the manner in which a spring motor of this type having constant force characteristics is made.

The spool 41 is freely pivotal about a pivot 44, and the spool 42 is freely pivotal about a pivot 45. The spool 43 is secured to the side plate 30″ of the reel 30 by threaded fasteners 46, so that the spool 43 rotates as a unit with the reel 30. Springs 47 and 48 are coiled about respective spools 41 and 42 but their inner ends are not secured to the respective spools. The outer ends of the springs 47 and 48 are secured by threaded fasteners 49 at diametrically opposed locations in recesses 50 in the spool 43. The springs 47 and 48 preferably are wrapped about the spool 43 at least one and one-half turn when the hose is fully wound on the reel 30. The springs 47 and 48 are each composed of a resilient metal strip or ribbon formed with such a set so that each wrap will naturally assume a radius smaller than that of the surface on which the wrap is to lie. In particular, the first wrap of each of the springs 47 and 48 lies against the outer annular surface of the spools 41 and 42, whereas each succeeding wrap lies against the immediately preceding wrap. Each spring 47 and 48 has a width and thickness and is formed with such a radius of curvature when unstressed from its inner end to its outer end, to neutralize the variable of the shortening lever arm as the spring is unwound, and thus each of the springs 47 and 48 transmits a substantially uniform torque to the spool 43 and in turn to the reel 30 so that a substantially constant force is required to be exerted by the user to pay out or unwind the hose 51 from the reel as it is being unwound.

A locking mechanism 52 disposed within the hollow hub of the reel 30 includes a housing 53 secured to side plate 30" by the threaded fasteners 46. The locking mechanism 52 includes a ratchet 54 secured against rotation to the shaft 27 and three spaced apart pawls 55 pivotally mounted by the side plate 30". The pawls 55 which are shown to be in engagement with the ratchet 54 in FIGURE 5 prevent rotation of the shaft 27 in the clockwise direction as viewed in that figure. When the hose 51 is pulled in a downward direction the uppermost pawls pictured in FIGURE 5 are thrown outwardly. If the hose 51 is permitted to be wound upon the reel 30 by the spring motors 39 and 40 while the two upper pawls 55 are out of engagement with the ratchet 54, the spring motors 39 and 40 will drive the reel 30 in its winding direction and move the end of the hose 51 in an upward direction until the ball-like stop 56 engages cover plate 57 for the box 11. As the stop 56 is larger than the hole 58 through which the hose 51 can pass freely, the stop 56 limits the upward movement of the hose 51. The locking mechanism 52 operates in the same manner as the locking mechanism of a conventional window shade.

Figure 2:
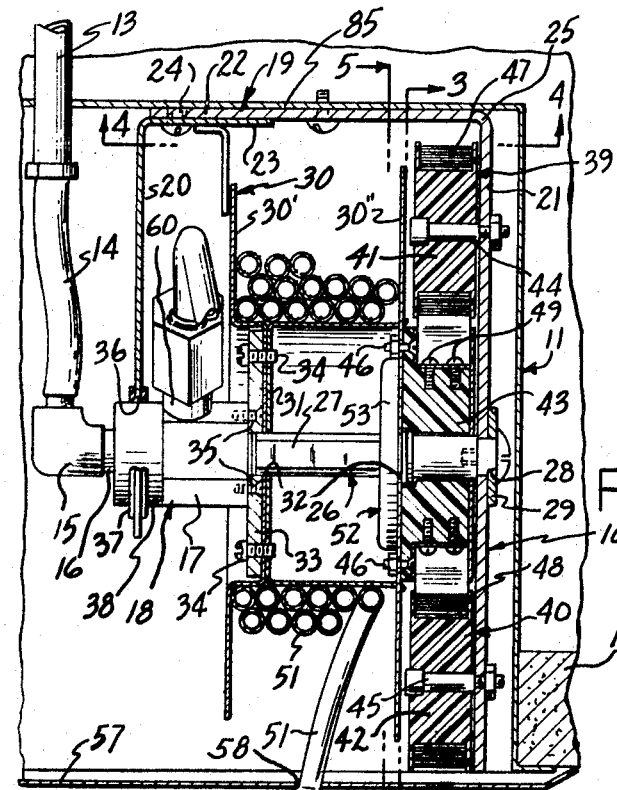
FIGURE 2 is an elevational view of the reel assembly of the invention mounted in a box.
Figure 3:
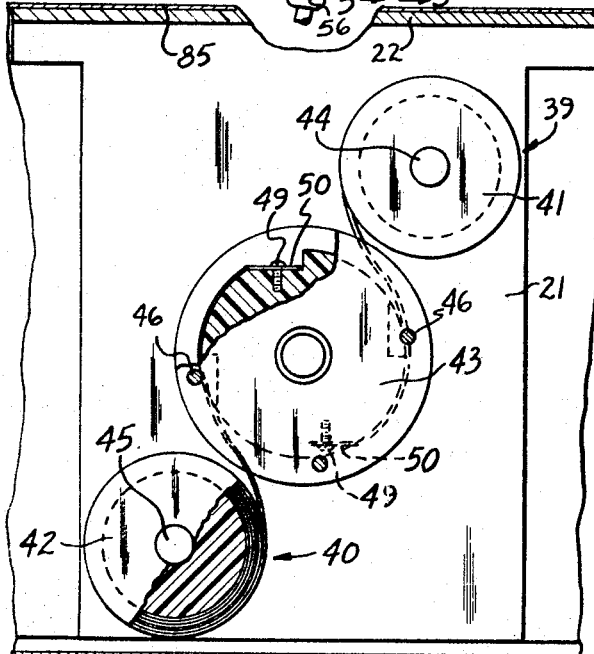
FIGURE 3 is a sectional view taken along line 3—3 of FIGURE 2.
Figure 4:
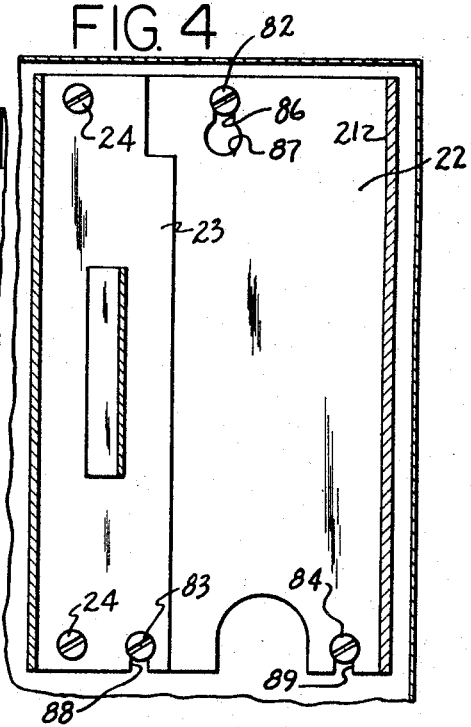
FIGURE 4 is a sectional view taken along line 4—4 of FIGURE 2.

Referring to FIGURES 2 and 6, a fitting 60 is shown to be connected to the body section 17. The fitting 60 has a bore 61 which communicates with a bore 62 in the body section 17. The body section 17 includes a bore 63 having a uniform diameter throughout its length. Stem 16 received in the bore 63 has a bore 64 open at one end 65. The stem 16 has an external annular groove 66. The space defined by the groove 66 and the bore 63 provides an annular passage 67. The bore 64 communicates with the passage 67 through opposed ports 68. In use, the stem 16 does not rotate whereas the body section 17 rotates with the reel 30. The body section 17 is secured by the screws 35. It is apparent that constant communication is achieved between the bore 64, the passage 67 and the bores 62 and 61, regardless of the position of the body section 17 with respect to the stationary stem 16. The stem 16 has a pair of opposed flats 70 which permit threaded end 71' to be threaded into the fitting 15 by means of a wrench (not shown). The body section 17 has internal annular grooves 71 and 72 disposed at each side of the passage 67. The grooves 71 and 72 receive resilient O-rings 73 and 74 respectively. The O-rings 73 and 74 each have an external diameter, before their insertion into grooves 71 and 72, less than the internal diameter of the respective groove; and O-rings 73 and 74 have sufficiently small internal diameters while disposed in respective grooves 71 and 72 to form a fluid-tight seal with stem 16. Thus, not only do the O-rings 73 and 74 form a seal with the grooves 71 and 72 but the O-rings 73 and 74 will permit the body section 17 to be rotated with respect to the stem 16 without binding, and yet, the seals 71 and 72 provide an effective seal.

The other end of the stem 16 has an enlarged head 75 which fits into an enlarged bore 76 which meets the bore 63 at a shoulder 77. The head 75 cooperating with shoulder 77 prevents the stem 16 from shifting in one lengthwise direction in the bore 63. A disc-shaped seal 78 is squeezed between body section 17 and a plate 79 when the three screws 35 are tightened, thus closing off the end of the bore 76. The seal 78 and the plate 33 prevent the stem 16 from shifting in the other lengthwise direction in the bore 63. Should any leakage exist between the stem 16 and the body section 17 at the seal 73, this leakage can be detected at an open end 80 of a bore 81 which communicates with the bore 76.

The hose reel assembly 10 can be quickly and easily mounted and dismounted from within the box 11 by one man. Screws 82, 83, and 84 threadably received by the mounting plate 85 of the box 11 are only turned into the mounting plate 85 far enough to take firm hold. One end of the plate portion 22 has an elongated slot 86 with an enlargement 87 which is larger than the head of the screw 82. Open-ended elongated slots 88 and 89 at the other end of the plate portion 22 are at least slightly narrower than the heads of cooperating screws 83 and 84. In mounting the reel assembly 10, the head of the screw 82 is aligned with the enlargement 87 of the slot 86 and then, with the mounting portion 22 urged against the mounting plate 85, the entire reel assembly 10 is shifted so that the heads of the screws 82, 83 and 84 suspended the reel assembly as a unit. Thereupon, the screws 82, 83 and 84 are tightened to firmly hold the reel assembly 10 in the box 11. Thereafter, the stem 16 of the swivel assembly 18 is threaded into the fitting 15. To dismount the reel assembly 10, reverse procedure can be used.

The embodiment shown in FIGURE 7 is identical to the embodiment shown in the preceding figures, except as discussed below, and hence like reference characters are employed wherever possible with the addition of letter $a$. A non-circular lug 90, which in particular is hex-shaped in section, is suitably secured as by welding to the side plate 30$a$" of the reel 30$a$. The spool 43$a$ has a hex-shaped recess 91 which receives the lug 90 snugly. With the lug 90 in the recess 91, the spool 43$a$ is effectively keyed to the reel 30$a$. The lug 90 has a bore 92 through which the stationary shaft 27$a$ passes. The lug 90 and the reel 30$a$ are free to rotate as a unit about the shaft 27$a$ when the locking assembly 52$a$ is out of locking position with respect to the stationary shaft 27$a$. This arrangement enables the spring motors to be readily mounted and dismounted from the remainder of the reel assembly.

Other embodiments and modifications of this invention will suggest themselves to those skilled in the art, and all such of these as come within the spirit of this invention are included within its scope as best defined by the appended claims.

I claim:

1. Reel assembly for a flexible hose, comprising: a reel adapted to receive a flexible hose, said reel including a hub having central bores at each side, a fixed shaft extended through the bores for rotatably mounting said reel, a plate mounted across the bore of one hub side for limiting axial movement of the reel along the shaft, spring means for urging said reel in winding direction, means for locking said reel to hold said reel in a preselected position against the force of said spring means, a swivel connection mounted to the plate in coaxial alignment with the shaft, said swivel connection including a body section having an annular exterior portion and an axial bore and a fixed stem received in the axial bore, the body section being rotatably journalled about the stem, means for rotatably mounting the annular portion of the body section, said stem having a continuous external groove opening into the axial bore, said body section having a radial bore in registry with said groove and in communication with said hose, an inlet in said stem open at one end for receiving a gas and opening into said groove, seal means providing a gas-tight seal between said body section and said stem at each side of said groove, and means for limiting the axial movement of said stem relative to said axial bore, the pressure exerted by the gas in said groove acting against the sides of the groove to cancel opposite forces tending to shift the stem relative to said body section.

2. Reel assembly as claimed in claim 1 including a seal for closing off one end of said axial bore, a passage in said body section between said seal and one of said seal means for enabling any leakage of said seal means to be checked.

3. Reel assembly as claimed in claim 1 wherein said body section has internal grooves opening into the axial bore, each of said seal means includes a resilient O-ring having an external diameter, before its insertion into its respective groove, less than the internal diameter of its respective groove, each O-ring having an internal diameter while in its respective groove to form a fluid-tight seal with said stem.

References Cited

UNITED STATES PATENTS

| | | | |
|---|---|---|---|
| 1,537,637 | 5/1925 | Jarvis | 137—355.23 XR |
| 1,752,048 | 3/1930 | Woodford | 137—355.23 XR |
| 2,071,174 | 2/1937 | Parker | 137—355.23 XR |
| 2,496,489 | 2/1950 | Palm | 137—355.2 |
| 2,530,114 | 11/1950 | Bugg et al. | 137—355.23 XR |
| 2,631,063 | 3/1953 | Jensen | 137—355.2 |
| 2,823,074 | 2/1958 | Bernard | 137—355.17 |
| 3,005,215 | 10/1961 | Colt et al. | 242—107 |
| 3,052,426 | 9/1962 | Avis | 242—107 XR |
| 3,085,768 | 4/1963 | Treutelaar | 242—107 |
| 3,156,431 | 11/1964 | Zivi | 242—107 |

SAMUEL SCOTT, *Primary Examiner.*